June 27, 1967          D. B. PALL          3,327,859
PORTABLE UNIT FOR POTABLE WATER
Filed Dec. 30, 1963
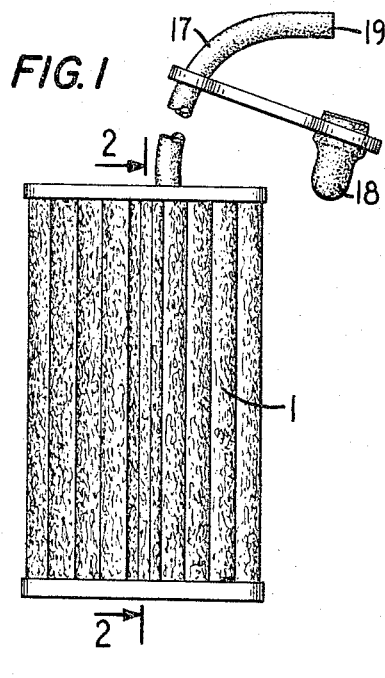
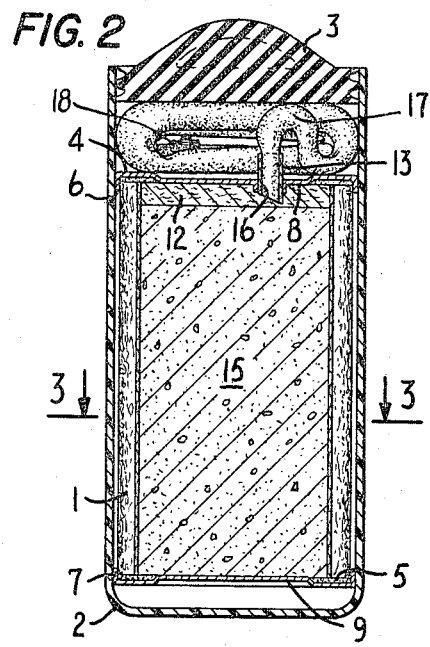
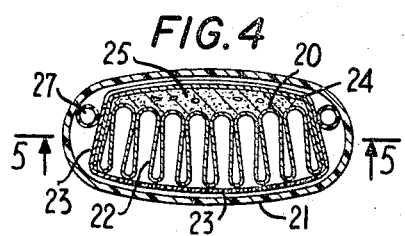
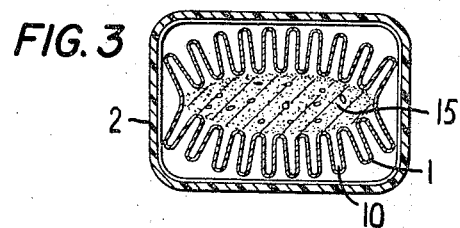
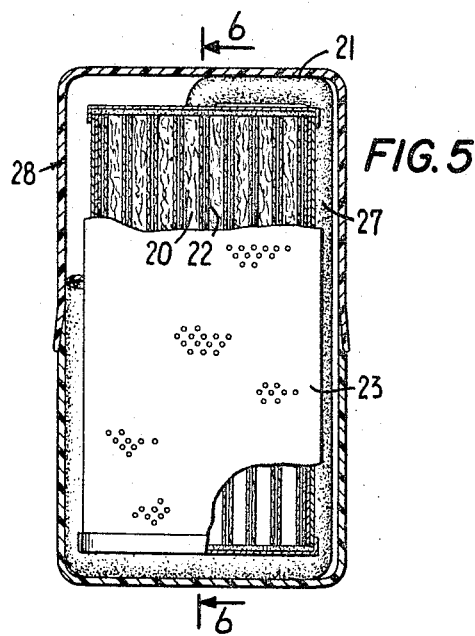
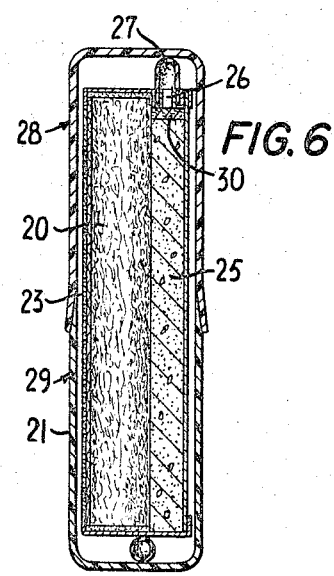

United States Patent Office 3,327,859
Patented June 27, 1967

3,327,859
PORTABLE UNIT FOR POTABLE WATER
David B. Pall, Roslyn Estates, N.Y., assignor to Pall Corporation, Glen Cove, N.Y., a corporation of New York
Filed Dec. 30, 1963, Ser. No. 334,330
5 Claims. (Cl. 210—266)

This invention relates to a filter assembly for sterilizing water, and more particularly, to a filter assembly incorporating a bactericidal filter for removing and killing bacteria found in polluted water.

The assembly is especially designed to be portable and to be operable manually simply by sucking filtered water from the assembly.

The obtention of potable water in areas remote from civilization has been a problem for armies and travelers in general down through the ages. To this day the best means available for purifying polluted water or ensuring safe water is either to boil the water or to add a tablet liberating chlorine or some other nontoxic disinfectant. It is obviously not always possible to boil water for drinking purposes, since a source of heat may be unobtainable, and the alternative, water-purfying tablets have to be carried in large quantities to guarantee a sufficient reserve in areas remote from sources of supply, and require a time delay of about one-half hour to purify the water.

In accordance with the invention, there is provided a filter assembly which is small enough to be portable, and which is manually operated, so that it can be used in any area, regardless of conditions, to ensure a supply of potable water from any source. Purity of the water is ensured by the provision of a filter element having pores of microscopic dimensions, sufficiently small to remove bacteria. As a further safety measure, the filter preferably is provided with a bactericidal agent which is capable of destroying bacteria removed by the filter, thus preventing bacteria from living and multiplying on the filter element. Further, a sufficient concentration of bactericide in the effluent will ensure continued purity on contact with non-sterile conditions, such as containers, after leaving the filter.

In addition, the filter assembly employed can also include an ion exchange resin or demineralizer which is capable of removing salts deleteriously affecting taste. Also, to improve flavor, and remove turbidity, there can be included activated carbon or like sorbent material capable of clarifying the water by removal of colloidal suspended material small enough to pass through the filter pores.

The filter assembly of the invention comprises, in combination, a filter element capable of removing and preferably of destroying bacteria, containing means supporting the filter element in a manner to separate filtered water from unfiltered water on opposite sides of the filter, and means for withdrawing filtered water from one side of the filter.

The containing means for example can take the form of end-caps closing off the open ends of a tubular filter element, or of a container one or more walls of which comprise a filter element in accordance with the invention. An embodiment of the former is shown in FIGURES 1 to 3, inclusive, and an embodiment of the latter in FIGURES 4 to 6, inclusive. Other variations of containing means will be apparent to those skilled in this art, inasmuch as the containing means constitutes no more than the supporting structure conventionally associated with filter elements to ensure separation of filtered liquid or filtrate from the impure liquid acted on by the filter.

The means from withdrawing filtered water can and usually will be a flexible tubing or pipe connection, the free end of which can be put in the mouth of the user for sucking. However, rigid connections can also be used.

The drawings illustrate two preferred embodiments of the invention.

FIGURE 1 is a side elevation of a filter assembly of the invention.

FIGURE 2 is a longitudinal section of the filter assembly of FIGURE 1, taken along the lines 2, 2 of FIGURE 1, and looking in the direction of the arrows.

FIGURE 3 is a cross-sectional view of the filter assembly of FIGURE 1, taken along the lines 3, 3, and looking in the direction of the arrows.

FIGURE 4 is a cross-sectional view of another embodiment of filter assembly of the invention.

FIGURE 5 is a side elevation partly in section of the filter assembly of FIGURE 4, taken along the lines 5, 5, and looking in the direction of the arrows.

FIGURE 6 is a longitudinal section of the filter assembly of FIGURE 4, taken along the lines 6, 6 of FIGURE 5.

The filter assembly of FIGURE 1 has a tubular corrugated filter element 1 made to fit tightly within an aluminum carrying case 2 closed by cover 3 for protection when not in use. The carrying case can also be made of other, preferably corrosion resistant metals, such as galvanized iron and stainless steel, or of molded plastic, such as polyethylene, polypropylene, nylon, polytetrafluoroethylene, or cellulose acetate. The top and bottom ends of the filter cylinder 1 are closed off by caps 4 and 5, respectively, which are formed with peripheral lips or flanges 6 and 7, closely fitting against the walls of the case 2. Central depressions 8 and 9 in the caps 4 and 5 position the folds 10 of the corrugated filter element between the caps.

The filter element 1 is made of a preferred microporous layer type of filter material having an average pore size of 0.15 micron, maximum 0.35 micron, and made of paper supporting a microporous layer of asbestos fibers. This filter element also is coated with 12.5% silver bromide by weight of the asbestos, a sufficient quantity to supply silver ion to the water in an amount adequate to kill bacteria removed by the filter for the life of the filter. The filter is in corrugated form, as best seen in FIGURE 3, for maximum surface area in the restricted volume of the carrying case.

Disposed within the folds of the filter 1 and the outer end caps 4 and 5 is a sorbent bed 15 of activated carbon. A hole 16 is provided in the upper end cap 5 opening into the interior of the filter cylinder. A metal nipple 13 is secured within the hole 16 by, for example, welding, although soldering or brazing can be used, as well as an adhesive or bonding agent. Beneath the nipple is a porous disc or pad 12 of glass wool or nylon, preventing loss of sorbent through the nipple. Attached over the nipple and secured thereto is a flexible tubing 17 with a protective cap 18 to cover the tubing end 19 that is put in the mouth when suction is applied. The tubing is sufficiently long to reach comfortably from the mouth of the user to the water supply, and is wound at the top of the filter for storage in the case 2 when not in use. The tubing shown is of rubber, but it can be of any flexible rubbery or plastic material, such as, for example, neoprene, polyisoprene, Buna N, Buna S, Viton A, polyethylene, polypropylene, polyvinyl chloride, polyvinylidene chloride, nylon, and rubberized fabric.

In operation, the cover 3 is removed and the filter 1 and its contents, the sorbent bed 15 are withdrawn from the case 2 and immersed in the contaminated water. The tubing is unwound, the cap 18 removed, and mouth suction is applied to the tubing end 19, whereupon water is drawn up, in sequence, through the microporous filter 1, the sorbent bed 15, the disc or pad 12, and the nipple 13, into and through the tubing 17 to the mouth of the user.

An outer perforated metal or plastic cannister can be used to protect the filter element from surface damage, and is especially useful in streams and the like, where it keeps floating debris or underwater rocks from contacting the filter. It also acts as a coarse filter to prevent large particles or dirt, insects, and fish from clogging the filter element prematurely. Ordinarily, however, the protection afforded by the protective case is adequate for filter element protection.

In the course of the passage of the water through the filter and activated carbon, the bacteria are removed from the water by the filter, and colloidal and other turbidity-imparting substances are removed in the bed of activated carbon, so that a stream of clear, pure water is obtained by the user.

The filter assembly of FIGURES 4 to 6 employs a filter element 20 in the form of a convoluted sheet having a plurality of folds 22. The filter element 20 forms one wall of a container, the remaining three side walls and end walls of which comprise a solid metal box 24, to two end walls of which the filter element 20 is attached by bonding, such as, for example, with an epoxy resin adhesive. The surface of the filter sheet 20 is protected by a perforated sheet cover 23 made of aluminum, although plastic materials such as polypropylene, or polyethylene can also be used. Within the space enclosed by the filter 20 and the box 24 is a bed 25 of activated carbon sorbent.

The filter element is removably inserted in a tightly fitting plastic case 21 made of polypropylene. Other plastic materials such as polyethylene, nylon and cellulose acetate propionate can be used, as well as corrosive-resistant metal, such as aluminum or stainless steel. It will be observed that the case 21 is formed in top and bottom sections 28 and 29, the former serving as a cover which when removed gives ready access to the contents.

A nipple 26 is fitted in a hole in one end wall of box 24 and to this nipple is attached a tubing 27, one end of which can be put in the mouth of the user and which is arranged to be wound at the top of the filter element for carrying purposes in the case. A porous nylon disc 30 prevents loss of sorbent through the nipple 26.

In operation, the top container section 28 is removed and the filter element 20 thrown into a stream or other source of water supply after unrolling the tubing 27. The end of the tubing is placed in the mouth of the user, who then sucks water from the water supply through perforated cover sheet 23 and the filter 20 into the bed 25 of sorbent. The filtered water thus obtained can only leave the sorbent bed through the nipple 26 and tubing 27, ensuring that all of the water removed by suction is filtered. In the course of the water's passage through the filter and the activated carbon bed, the bacteria are removed from the water by the filter, and colloidal and other turbidity-imparting substances are removed in the bed of activated carbon, so that a stream of clear, pure water is obtained from the assembly.

The filter assembly of the invention can employ any type of microporous filter element whose pore diameter is sufficiently small to remove harmful bacteria and other phathogenic organisms. For this purpose, the microporous filter element should have a maximum pore size of less than about 0.5 micron and preferably an average pore size of less than about 0.2 micron. There is no effective lower limit on the pore size of the microporous filter, except that imposed by the excessive pressure required to force water to pass through the filter, an unduly low rate of flow through, and more rapid plugging. It has been found, in practical applications, that microporous filters having an average pore size as low as 0.02 micron and even lower are effective.

The depth or thickness of the microporous fibrous filter is not critical. A thick filter operates efficiently, but it should not create an undue pressure drop.

A preferred microporous filter for use in this invention is made of a porous base, such as paper, having relatively large pores, within or on the surface of which is deposited particulate material in an amount to diminish the average diameter thereof to less than 1 micron while retaining a voids volume in the microporous portion in excess of 75%, as disclosed in copending application French Patent No. 1,318,029, and in U.S. Ser. No. 215,151 filed Aug. 6, 1962, now U.S. Patent No. 3,246,767, the disclosures of which are herein incorporated by reference. The particulate material, which can be in the form, for example, of fibers or fine structured granules, is suspended in a fluid and deposited therefrom upon the surface of the porous base material. The particulate material can all be of the same size and type, or of two or more sizes and types, all suspended in the fluid system. The desired reduction in pore diameter of the base is obtained by varying the size and amount of the particulate material deposited, blending different sizes at different points, if desired. A particularly preferred microporous filter is one of the type described in application Ser. No. 215,151, filed Aug. 6, 1962, now U.S. Patent No. 3,246,767, which comprises a porous base having superimposed thereon and adherent thereto a microporous layer comprising a fibrous material of which a proportion of fibers extend outwardly from the porous base at an angle greater than 30°, the microporous layer having an average pore diameter of less than 1 micron and a voids volume of at least 75%. The fiber spacing and angular disposition to the base throughout the entire microporous layer is noted by cross-sectional examination, upon sufficient magnification through an optical or electron microscope. The angular disposition of the fibers is in a large measure responsible for the high voids volume and low pore size characteristic of these microporous filters.

When fibers are laid down on a base in a conventional manner, they tend to lie almost entirely in planes parallel to the base. Such conventional fiber layers can be permeable to fluids, and can have a fairly low pore size, but they are universally characterized by low voids volume, so that their use as filter media is not feasible. The proportion of angularly extending fibers, and the wide spacing of the fibers, both of which are characteristic of the preferred filters, serve to hold the fibers in the layer generally farther from the base, thereby increasing substantially the voids volume of the microporous layer. Since the fibers are relatively small, the interstices between them at their points of crossing will be very small, but since they are held farther apart, their interstices are fewer in number per unit volume. In consequence, the preferred filters have a very small pore size, and a high voids volume.

In order to insure good adhesion between the deposited layer and the base, an anchoring layer can be applied to the base prior to the application of the main layer. Such an anchoring layer is applied by treating the base with an anchoring dispersion comprising a liquid or liquefiable binding agent and a particulate fibrous material which is wetted by the binding agent.

Fibrous material is preferred as the particular material to be deposited because of its versatility, and because of the greater ease of deposition as a film. A great variety of diameters of fibers are available, thus making it possible to achieve a very large assortment of mixtures of different diameter fibers for making fibrous material of any porosity, and such fibers can be made of any length, so as to take advantage of the greater cohesiveness of a layer of long fibers, as compared to granular material layers. Generally, fibers having diameters of 2 microns or less are preferred. Typical fibrous materials include glass, asbestos, potassium titanate, aluminum silicate, mineral wool, regenerated cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, and metallic fibers such as iron, copper, aluminum, stainless steel, brass monel, silver, and titanium.

Nonfibrous particulate materials can be used in admixture with fibrous materials. However, in order to achieve the requisite microporosity and voids volume, it is essential to employ at least one part by weight of fibrous material for every three parts of nonfibrous materials. When nonfibrous particles are employed, they should have an average diameter not exceeding 10 microns. Those nonfibrous materials containing a fine internal structure or porosity are preferred.

Typical nonfibrous particulate materials are diatomaceous earth, magnesia, silica, talc, silica gel, alumina, quartz, carbon, activated carbon, clays, synthetic resins and cellulose derivatives, such as polyethylene, polyvinyl chloride, polystyrene, polypropylene, urea-formaldehyde, phenol-formaldehyde, polytetrafluoroethylene, polytrifluorochloroethylene, polymers of terephthalic acid and ethylene glycol, polyacrylonitrile, ethyl cellulose, polyamides, and cellulose acetate-propionate, and metal particles such as aluminum, silver, platinum, iron, copper, nickel, chromium and titanium and metal alloys of all kinds, such as monel, brass, stainless steel, bronze, Inconel, cupronickel, Hastelloy, beryllium, and copper. Combinations of diatomaceous earth and glass fibers give excellent results.

The microporous layer can also include as adjuncts substances which impart special effects to the fluid passed through the finished filter, such as bactericides, mildew proofing agents, fungicides, miticides, and the like. These ingredients may be dissolved in the fluid as it passes through the filter. Eventually, of course, they will be leached out, but enough is added to last the life of the filter, which in any case can be used only until plugged by the suspended matter removed from the water.

Bactericidal filters thus are obtained which not only filter out the bacteria because of the small pore size of the filter, but which also kill the bacteria thus removed, preventing growth of colonies of pent-up bacteria on the filter element. Bactericides such as sparsely-soluble nontoxic silver salts, capable of releasing small nontoxic concentrations of silver ion to water can be used, such as silver chloride, silver bromide, silver iodide, silver oxide or silver sulfide. The silver component can be coated on the particulate material, or simply dispersed with it in the application dispersion, or applied to the microporous layer after laydown from a separate dispersion or slurry.

Similar application procedures can be used for other adjuncts, for instance, copper 8-hydroxy quinolate, a satisfactory mildewproofing and fungicidal agent useful alone or together with a silver salt such as silver bromide.

The particulate material itself can be an ion exchange resin. Such resins also may be included as adjuncts. Such materials are well known, and any of the known cation and anion exchange materials can be used. They are characterized by a polymeric matrix to which are attached functional groups capable of reaction with cations and anions.

Suitable active acidic functional groups linked to a polymeric matrix include —SO$_3$H, —COOH and the like, —SO$_3$H being preferred because of its high dissociation constant exceeding $10^{-3}$ in suitable resin-forming compounds. The exchangeable hydrogen ion may be partially or completely substituted by other substantially dissociated cations such as the alkali metal ions, the alkaline earth metal ions, such as calcium or magnesium, and also silver, copper, and ammonium ions, and the like. Typical polymeric matrices to which the functional groups are linked include phenol-aldehyde resins; polystyrenedivinylbenzene copolymers and the like. Similarly suitable active basic groups linked to polymeric matrices include quaternary ammonium hydroxides—

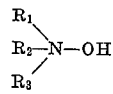

amino groups, the guanidyl group,

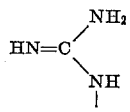

the dicyandiamidine group

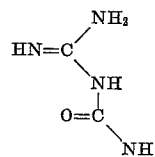

and the like organic nitrogen containing basic groups.

Quaternary ammonium hydroxide groups, the guanidine and the dicyandiamidine residue are among the preferred basic groups because of their high dissociation constant exceeding $10^{-3}$. Typical polymers to which active basic groups are linked include the urea-formaldehyde type resins, the melamine-formaldehyde type resins, the polyalkylene-polyamine-formaldehyde resins and the like. The exchangeable hydroxyl ions may be partially or completely substituted by other substantially dissociated anions such as Cl—, NO$_3$—, SO$_4$=, and the like.

Any porous material whose pores extend from surface to surface can be used as a base upon or within which the microporous layer is deposited. One or several layers of the same or varying porosity can be employed and can be composed of cellulose or other fibers. Paper, which can, if desired, be resin-impregnated, is a preferred base material since it yields an effective, versatile and inexpensive microporous fluid-permeable medium. Where desired, other base materials can be used, such as porous sintered powders or forms of metals and of natural or synthetic plastic materials, such as aluminum, and synthetic resins and cellulose derivatives, in the form of spongy layers of any desired thickness, such as polyurethane (see Patent No. 2,961,710), polyvinyl chloride, polyethylene and polypropylene sponges and foams, woven wire products, sintered or unsintered, textile fabrics and woven and non-woven fibrous layers of all kinds, such as felts, mats and bats, made of fibrous materials of any of the types listed below in connection with the particulate material. The porous base material will have an average pore diameter of not less than about 2.5 microns. Such materials will of course have pores as large as 20 to 25 microns, or more.

The fluid medium used for the dispersion is preferably inert to the particulate material and the base material. It should not dissolve a substantial amount thereof, although if the fluid is reused, the fact that some material is in solution is not a disadvantage, since a saturated solution is quickly formed ab initio. The fluid should be volatile at a reasonably elevated temperature below the melting point of the material to facilitate removal after the dispersion is deposited. However, non-volatile fluids may be desirable under certain conditions, and those can be removed, by washing out with a volatile solvent that is a solvent for the fluid but not for the particulate material.

Typical fluids are water, alcohols, polyalkylene glycols, such as polyethylene glycols, poly 1,2-propylene glycols, and mono and di alkyl ethers thereof, such as the methyl, ethyl, butyl and propyl mono and di ethers, dialkyl esters of aliphatic dicarboxylic acids, such as, di-2-ethyl-hexyl adipate and glutarate, mineral lubricating oils, hydraulic fluids, vegetable oils and hydrocarbon solvents such as xylene and petroleum ether, silicone fluids, chloro, bromo and fluoro hydrocarbons, such as the Freons. Since the final product is permeable to any liquid, depending upon the choice of particulate material, obviously a wide selection of fluids is available, and such would be known to one skilled in this art.

The microporous filter used in this invention is preferably in pleated or corrugated form to expose maximum surface area to the passage of water within the limits of a confined unit. Where the filter employed is not in corrugated form but instead is of the smooth cylindrical type, even if made of the preferred fibrous depth variety of filter, a greater resistance to the passage of water will be developed unless a much larger size filter is employed, thus making the unit very large and inconvenient for use. Where, of course, size or space limitations are not a problem, smooth filters can be resorted to, if the pleated or corrugated variety is not available. The length of the corrugated filter element as well as the depth and number of the corrugations will depend upon actual service requirements. Generally, elements having a length of from 2 to 30 inches, internal diameters (measured at the base of the corrugations) of from 0.5 to 20 inches, external diameters of from 0.8 to 25 inches and from about 10 to 1000 pleats give good results. However, elements having different dimensions are useful under particular operating conditions.

The sorbent by means of which the water is to be clarified can be of any type known to the art for use in sorbing naturally occurring water. The term "sorption" is inclusive of the processes known as "adsorption" and "absorption," the distinction being that molecules are said to be "absorbed" when they enter the inside of a solid material, i.e., the absorbent, and are said to be adsorbed when the molecules remain attached to the surface of the solid adsorbent.

Activated carbon is the preferred sorbent for use in this invention, since it is capable of efficiently sorbing contaminants from water without being affected by any moisture contained in the air. Activated carbon can be employed alone.

A number of other materials also have activity as sorbents, such as, for example, various crystalline substances and such other materials as chabicite, pumice, silica gel, chromic oxide gel, lithopone, powdered porous glass, glass wool, activated alumina, quartz crystals, fuller's earth, Cecil soil, Barnes soil and glaucosil.

It is preferable that the sorbent employed have a large surface area exposed to the passage of water. Accordingly, it is preferred that the solid sorbents be in particulate form, and not be compressed.

The sorbent should be located within a confined area which is permeable to the free passage of the water, so that the water is passed through or over the sorbent. For example, the sorbent can be located within a cannister outside or inside of the filter element in the path of the water.

The quantity of sorbent required is proportional to the volume of water to be treated.

The following is claimed:

1. A filter assembly for purifying water, comprising, in combination, a generally tubular filter element, convoluted at least in part and having a high surface area and dirt capacity, said filter element having an average pore diameter within the range of 0.15 to about 0.35 micron, a bactericidal agent in an amount sufficient to kill pathogenic organisms on the filter element; a sorbent bed disposed within the filter element for removing turbidity-producing substances from the water; containing means supporting the filter element in a manner to separate filtered water from unfiltered water on opposite sides of the filter; a tube communicating with the sorbent bed for withdrawing filtered water from the assembly, one end of said tube being adapted to fit in the mouth of the user for sucking; a porous disk disposed in the line of flow between the sorbent bed and the tube for preventing passage of the sorbent into the tube; and a case protectively enclosing the filter element when not in use.

2. A filter assembly in accordance with claim 1, in which the sorbent bed is composed of activated charcoal.

3. A filter assembly in accordance with claim 1, in which the bactericidal agent is a silver salt.

4. A filter assembly in accordance with claim 1, wherein the containing means comprises end caps closing off the open ends of the tubular filter element.

5. A filter assembly in accordance with claim 1, wherein the containing means comprises a portion of the case, said case being in the form of a box having an open side, and wherein the filter element is attached across the open side.

References Cited
UNITED STATES PATENTS

| | | | |
|---|---|---|---|
| 2,082,322 | 6/1937 | Brundage | 210—266 X |
| 2,463,327 | 3/1949 | Snell et al. | 210—501 X |
| 3,165,472 | 1/1965 | Briggs | 210—493 X |
| 3,178,025 | 4/1965 | Brucken et al. | 210—266 |
| 3,246,767 | 4/1966 | Pall et al. | 210—505 |

FOREIGN PATENTS

| | | |
|---|---|---|
| 1,863 | 1882 | Great Britain. |
| 11,539 | 1887 | Great Britain. |

SAMIH N. ZAHARNA, *Primary Examiner.*